United States Patent [19]

Eisler

[11] Patent Number: 4,842,397
[45] Date of Patent: Jun. 27, 1989

[54] APPARATUS FOR ADJUSTING THE ANGULAR POSITION OF OPTICAL ELEMENTS

[76] Inventor: Gyula Eisler, 81/a, Endrődi Sándor utca, 1026 Budapest, Hungary

[21] Appl. No.: 127,287

[22] Filed: Dec. 1, 1987

[30] Foreign Application Priority Data

Dec. 3, 1986 [HU] Hungary ............................ 5005/86

[51] Int. Cl.$^4$ ........................... G02B 7/02; G02B 7/18
[52] U.S. Cl. ..................................... 350/634; 350/321; 350/252
[58] Field of Search ............... 350/636, 634, 633, 632, 350/252, 321, 486, 487, 321; 372/107; 248/487, 479

[56] References Cited

U.S. PATENT DOCUMENTS

| | | | |
|---|---|---|---|
| 3,204,471 | 9/1965 | Rempel | 350/634 |
| 3,229,224 | 1/1966 | Waly et al. | 372/107 |
| 3,436,050 | 4/1969 | Tibbals | 350/633 |
| 3,478,608 | 11/1969 | Met | 350/634 |
| 3,577,791 | 5/1971 | Broek | 350/633 |
| 3,596,863 | 8/1971 | Kaspareck | 248/487 |
| 3,700,313 | 10/1972 | Karr et al. | 372/107 |
| 3,753,150 | 8/1973 | Zar | 372/107 |
| 3,866,140 | 2/1975 | Hobart et al. | 372/107 |
| 3,953,113 | 4/1976 | Shull | 350/634 |
| 4,442,524 | 4/1984 | Reeder et al. | 372/107 |
| 4,712,444 | 12/1987 | Lewis | 350/634 |

OTHER PUBLICATIONS

A. Frosch et al., "Positioning Device for Optical Components", *IBM Tech. Dis. Bull.*, vol. 18, No. 10, Mar. 1976, p. 3333.
P. S. Stankiewicz, "Swivel Mounting", *IBM Tech. Dis. Bull.* vol. 20, No. 3, Aug. 1977, pp. 968-969.
J. Killpatrick et al., "Alignment Characteristics . . . ", Proc. of the IRE, Jun. 1962, p. 1521.

*Primary Examiner*—Jon W. Henry
*Attorney, Agent, or Firm*—Young & Thompson

[57] ABSTRACT

The invention relates to an apparatus or adjusting mechanism for adjusting optical elements with two degrees of freedom.

The essential feature of the adjusting mechanism proposed by the invention is its being built up of a tilting mechanism provided with a knuckle-joint system arranged between the stand and supporting platform of said tilting mechanism and connected in series with them to form a kinematic chain, further, comprising a deformation frame provided with a second knuckle-joint system, a coarse, quick-setting mechanism arranged between said supporting platform and deformation frame, and a fine setting mechanism located between said tilting mechanism and said stand.

The advantages of the adjusting mechanism complying with the invention is the possibility of performing quickly—within a wide range and with a very high, interferometric moving and aligning precision—the adjustment of optical elements into the desired angular position, entirely slipfree, providing thus a setting accuracy commensurate with the wavelengths of light.

In the course of adjustment the axes of rotation pass through the center of the optical element, therefore only the angular position of the latter changes, and the degrees of freedom are independent, so that the setting can be carried out conveniently, quickly and in an invariant way. The mechanical setup and production of the adjusting mechanism are simple, requiring no special technology.

The adjusting mechanism may be applied with the advantage to measurements, occurring mainly in the field of laser applications, where wide setting ranges and high setting resolutions are required.

8 Claims, 2 Drawing Sheets

APPARATUS FOR ADJUSTING THE ANGULAR POSITION OF OPTICAL ELEMENTS

FIELD AND BACKGROUND OF THE INVENTION

The invention relates to a mechanism for easy and quick adjustment of optical components with two degrees of freedom, applicable with advantage to course and fine, invariant setting of optical components, such as mirrors and lenses, around two axes perpendicular to each other.

As is known, it is a general task in accomplishing optical setups and optical trains to adjust mirrors and lenses in relation to the path of rays with specified precision. A limit is imposed on the attainable precision of setting by the stickslip resulting from the sliding or rolling friction between elements of the setting mechanism while being displaced with respect to each other. A general requirement to be fulfilled by the setting mechanisms is to minimize the errors due to the effects of stick slip arising in the course of adjustments. This is especially important with the spreading use of laser applications, where precision of setting has be equal to, or better than the wavelength of light, i.e. the precision should fall into the interferometric range of accuracy.

In Hungarian patent specification No. 177670, a swing mounting suitable for the adjustment of optical elements to interferometric precision with two degrees of freedom and for the centering of such elements is described.

In the specification it is stated that by means of the bearing arrangement accomplishing conditions of pure rolling friction, the stick slip occuring in the course of adjustments has been considerably reduced, but not entirely eliminated. The effect causing the phenomenon of stick slip and resulting from differing magnitudes of static and moving frictions cannot fully be eliminated by applying rolling guide elements.

Another deficiency of the described mechanism can be attributed to the centering insert built up of many kinematic pairs that fail to fulfil the severe requirements of mechanical stability indispensable with adjustments of interferometric precision.

A great disadvantage of the prior mechanism lies in its relatively narrow setting range and in the limited accuracy and reproducibility of settings, rendering it unsuitable for making adjustments equal to, or better than, the wave lengths of light.

A further drawback of the mechanism is that on the course of high-precision interferometric measurements, adjustments can only be made very slowly.

The purpose of the present invention is to eliminate simultaneously all of the above deficiencies by providing a mechanism suitable for rapid and invariant stick-slip free adjustment of the angular position of optical elements with two degrees of freedom and with a precision equal to, or better than the wave lengths of light, and by being relatively simple in its construction permitting economical production.

DISCLOSURE OF THE INVENTION

The invention is based on the recognition that the set aim can be simply attained by composing an apparatus or setting mechanism of a rapidly adjustable, wide-range setting means and of a fine setting means, providing the latter with a special articulate system made up of a deformation joint ensuring friction-free angular displacement around theoretical axes.

The adjusting mechanism is, thus, an improved version of a known mechanism used for adjusting optical elements, composed of a stand, a platform for supporting the optical element, a platform suspension mechanism and a mechanism for producing the required displacements.

The improvement, i.e. the invention itself lies in providing the adjusting mechanism with a tilting mechanism comprising a first knuckle-joint system located between the stand and supporting platform and with a deformation frame comprising a second knuckle-joint system connected in series with the tilting mechanism and forming a kinematic chain with the latter. Further, the adjusting mechanism has a quick-moving setting mechanism located between the supporting platform and deformation frame and a fine-moving setting mechanism located between the tilting mechanism and stand.

In other words an apparatus is provided for the adjustment of optical elements with two degrees of freedom which comprises a stand, a supporting platform linked up with the stand through a knuckle-joint system rotatable around a first and a second axis perpendicular to each other and further having a setting mechanism serving for rotating or tilting the supporting platform around the first and second axis of rotation. According to the invention this basic construction is supplemented so that the stand and the supporting platform are connected with each other by a frame associated with a second knuckle joint system rotatable around the first and second axes of rotation and the frame is provided with a fine setting mechanism serving for angularly displacing the frame around the first and second axes of rotation. According to the invention the second knuckle-joint system is constituted of resilient joints each comprising a deformable member. Operating the fine setting mechanism causes the frame to tilt around the second knuckle system. The deformable members of the second knuckle system are fixed or inherent to the frame, therefore this frame is referred to as a deformation frame.

According to the invention it is expedient if the tilting mechanism has a stationary part fixed to the deformation frame, a tilting ring bearing against ball-seatend tilting pivots arranged between the stationary part and supporting platform, and a first draw spring for coupling together the stationary part, supporting platform and tilting ring.

It is also expedient to provide the deformation frame with two first tilting blocks arranged perpendicularly to the horizontal axis, with two second tilting blocks perpendicular to the vertical axis, with a spacer holding the tilting blocks together to make them form a rigid frame, with at least one knuckle joint, but expediently arranged in pairs along the horizontal and vertical axes, respectively, formed by holes bored through the tilting block, and with at least one first and one second outer member, respectively, located expediently by pairs, arranged perpendicularly to the horizontal and vertical axes, respectively, each being separated from the respective tilting block by a gap and coupled to the tilting blocks by means of knuckles.

It is further expedient to provide the quick-setting mechanism with a first setting screw driven into the tilting ring and bearing against the supporting platform, and with a second setting screw driven into the stationary part and bearing against the tilting ring.

It is also expedient to provide the fine setting mechanism with a micrometer mounted on the stand, and the course setting mechanism with another micrometer fixed to the micrometer support located on the stand and coupled to the stationary part of the course setting mechanism by means of a supporting stub and bearing against the supporting block, and if both setting mechanisms are fitted with a pair of second draw springs connecting the micrometer support to the supporting block.

It is further expedient to provide the first knuckle-joint systems with ball-seat-end tilting pivots bearing against the tilting ring, one being fixed in the stationary part of the coarse setting mechanism and arranged along the vertical axis, whereas the other is fixed in the supporting platform and arranged along the horizontal axis.

It is also expedient to provide the second knuckle-joint system with knuckles—each confined by two holes—connecting the first and second tilting blocks and the first and second outer members of the deformation frame along the horizontal and vertical axes.

Furthermore, it is also expedient to provide the second knuckle-joint system with leaf-spring knuckles for connecting the first and second tilting blocks and the first and second outer members of the deformation frame.

BRIEF DESCRIPTION OF THE DRAWINGS

The adjusting mechanism complying with the invention is described below with reference to the attached drawings, where.

DESCRIPTION OF THE PREFERRED EMBODIMENT

Figure 1:
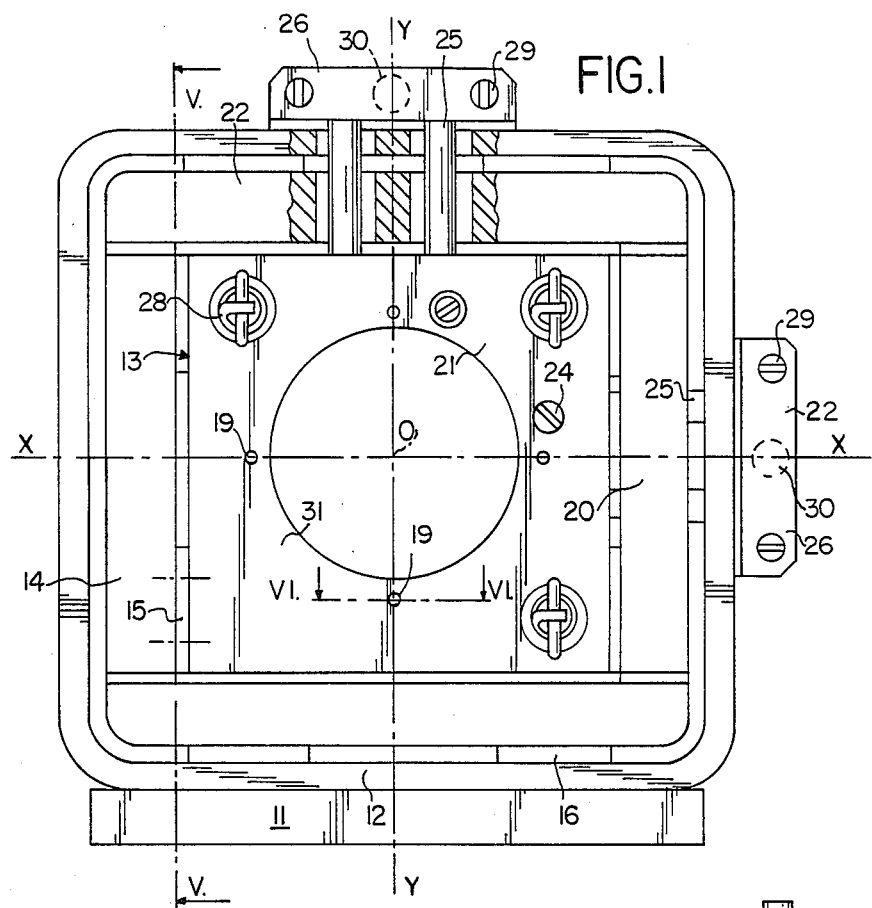
FIG. 1 is the front view of the setting mechanism.
Figure 2:
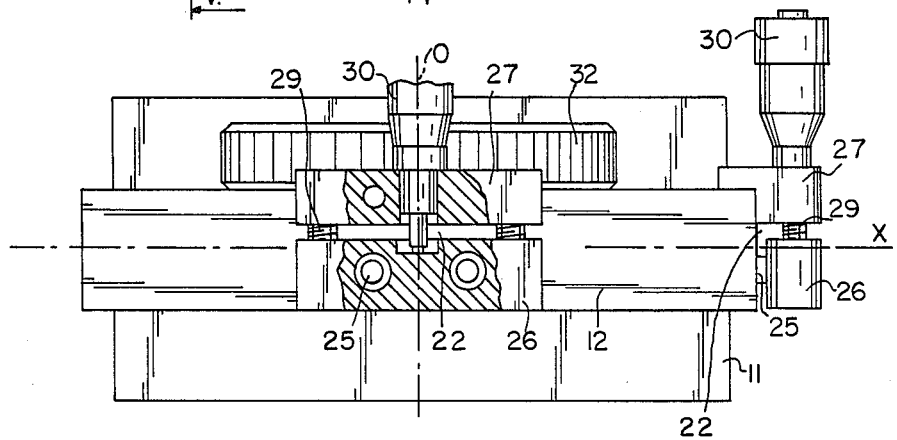
FIG. 2 is the top view of the setting mechanism.

The tiltable mounting complying with the invention, its front view being shown in FIG. 1 and its top view in FIG. 2, consists of a second knuckle-joint system comprising knuckles 20 and fixed to a stand 12 through interposed inner spacers 16 and fastened on base plate 11, a deformation frame 14 comprising supporting pin 25 coupled to tilting mechanism 13, micrometer support 27 fixed to the stand 12, micrometer 30 and fine setting mechanism 22, a first knuckle-joint system fixed to deformation frame 14 through inner spacer 15, and comprising ball-seat-end tilting pivots 19, a coarse setting mechanism 21 comprising a first and a second setting knob 23 and 24, a first draw spring 28, and a tilting mechanism 13 comprising a platform 31 supporting the optical element.

Optical element holder 32 is attached to supporting platform 31, and is designed so as to ensure proper positioning of the active face—plane or axis—of the optical element in the plane defined by horizontal axis X and vertical axis Y. The fulcrums (centers of rotation) of ball-seatend tilting pivots 19 of the first knuckle-joint system permitting the adjustment of tilting mechanism 13 and the fulcrums (centers of rotation) of the knuckles 20 of second knuckle joint system ensuring the adjustment of the deformation frame 14 are located also in the plane defined by horizontal axis X and vertical axis Y, arranged by pairs along these axes. This arrangement of knuckles 20 and ball-seat-end tilting pivots 19 ensures rotation of the optical element around axes X and Y free of translatory displacements In stand 12 and in deformation frame 14 holes are provided to receive supporting stubs 25 for connecting spacer blocks. 26 and tilting mechanism 13. Inner spacers 15 serve for establishing firm connection between tilting mechanism 13 and deformation frame 14 and for providing between them sufficient room to permit their displacement during setting, whereas outer spacers 16 serve for establishing firm connection between stand 12 and deformation frame 14 and, also, for providing room between them that is required during adjustments. First draw springs 28 eliminate the play between the elements of the tilting mechanism 13 changing their positive with respect to each other and that of the coarse setting mechanism 21, while second draw springs 29 serve for eliminating the play between elements of deformation frame 14 changing their relative position with respect to each other and that of fine setting mechanism 22.

While using the setting mechanism, the coarse adjustment of the optical element located in the optical axis O of optical element holder 32 around the horizontal axis X can be made by means of the first setting knob 23, and its coarse adjustment around the vertical axis Y by means of the second setting knob 24.

Fine adjustment of the optical element, clamped to its supporting platform 31 is done around the horizontal axis X by means of micrometer 30 arranged along the vertical axis Y, and its fine adjustment around the vertical axis Y can be done by means of micrometer 30 arranged in the horizontal axis X. In the course of quick (coarse) setting of the optical element, the elements of coarse setting mechanism 21 are moved with respect to each other, whereas in the course of fine setting the coarse setting mechanism is moved with respect to stand 12.

Figure 3:
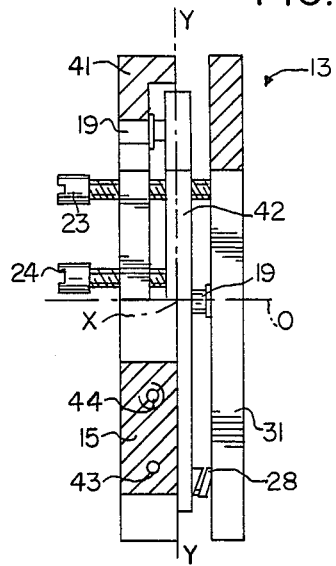
FIG. 3 is a semisectional view of the tilting mechanism.

Tilting mechanism 13 illustrated in the semisectional view of FIG. 3 comprises optical element supporting platform 31, stationary part 41, ball-seat-end tilting pivots 19 ensuring rotation of supporting platform 31 around horizontal axis X and with respect to tilting ring 42, ball-seat-end tilting pivots 19 ensuring rotation of tilting ring 42 around vertical axis Y and relative to stationary part 41, first setting knob 23 for adjustment around horizontal axis X, second setting knob 24 for adjustment around vertical axis Y, locating peg 43, first fixing screw 44 and first draw springs 28 for drawing the support platform 31 toward the stationary part 41 and tiling ring 42.

Stationary part 41 of the tilting mechanism 13 is clamped to the deformation frame 14 through interposed inner spacers 15 and by means of the locating peg 43 and the first fixing screw 44.

Stationary part 41 and tilting ring 42 of the tilting mechanism 13 are clamped together by means of the two tilting pivots 19. Tilting ring 42 is connected with supporting platform 31 also by two tilting pivots 19. Tilting pivots 19 are firmly clamped to stationary part 41 and to supporting platform 31, respectively. Tilting pivots 19 are located by pairs along the horizontal axis X and vertical axis Y that are perpendicular to the optical axis O, and the active ends of the tilting pivots 19 bear against tilting ring 42 in the plane defined by the axes X and Y. Coarse angular adjustment of the supporting platform 31 around horizontal axis X is made by means of first setting knob 23 located in a small-pitch tapped hole cut into tilting ring 42 and its rounded-off end bearing against supporting platform 31. Coarse angular adjustment of supporting platform 31 around vertical axis Y is made by means of a second setting screw 24 located in another hole tapped with a small-pitch thread provided in stationary part 41. First setting knob 23 is led through another hole bored in stationary part 41, so that it does not come into contact with part 41. A permanent kinematic coupling is provided between supporting platform 31, stationary part and tilting ring 42 by means of three first draw springs 28.

Figure 4:
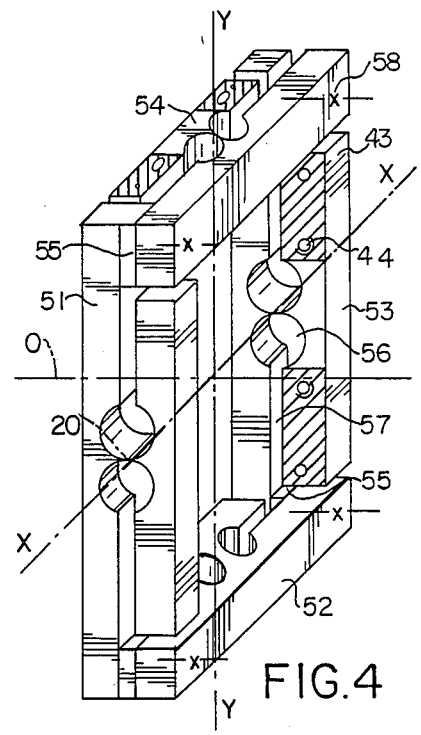
FIG. 4 is a perspective view of the deformation frame.
Figure 5:
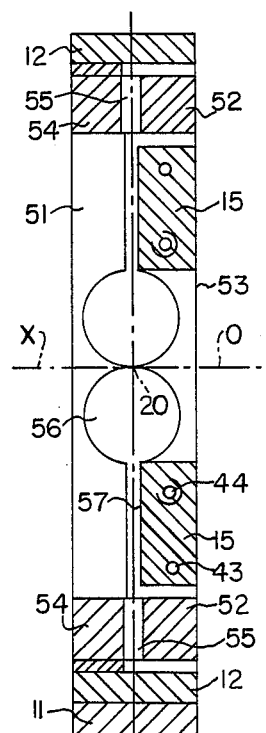
FIG. 5 is a section of the deformation frame taken along line V—V of FIG. 1.

Deformation frame 14 shown in perspective view in FIG. 4 and in section in FIG. 5 is formed of the base plate 11, stand 12, inner and outer spacers 15 and 16, knuckles 20, locating peg 43, first fixing screw 44, two second tilting blocks 52 arranged perpendicularly to the vertical axis Y, two first tilting blocks 51 perpendicularly arranged with respect to the horizontal axis X, first and second outer members 53 and 54, shims 55, holes 56, gaps 57 and second fixing screws 58.

Two first outer members 53 constituting one unit with first and second tilting blocks 51 and 52 respectively, and arranged perpendicularly with respect to horizontal axis X, as well as the two second outer members 54 perpendicular to vertical axis Y are formed by machining holes 56 and gaps 57. The thinned-off tape-like sections of material, each a few tenths of a millimeter thick remaining between holes 56, constitute knuckles 20.

Deformation frame 14 and first and second tilting blocks 51 and 52, respectively, through shims 55 interposed between their ends, are clamped together to form a rigidly coupled unit by means of second fixing screws 58. The moments of inertia of knuckles 20 connecting first and second tilting blocks 51 and 52 and first and second outer members 53 and 54 respectively, referring to the horizontal axis X and to the vertical axis Y, are very small, due to the small thickness of material forming the knuckles, so that the first and second tilting blocks 51 and 52 and first and second outer members 53 and 54, respectively, can be angularly displaced with respect to each other around horizontal axis X and vertical axis Y, by applying a minimum torque through turning micrometer 30. By displacing the first and the second outer members 53 and 54, respectively, the optical element coupled with them and located in the optical axis O can be brought into the desired position. First outer member 53 rotatable around the horizontal axis X is attached to the tilting mechanism 13 through inner spacers 15, by means of the locating peg 43 and the first fixing screw 44, whereas second outer member 54 is clamped to stand 12 through outer spacers 16 and also by means of locating peg 43 and the first fixing screw. With such an arrangement of structural parts, knuckles 20 ensure that the tilting mechanism 13 will be capable of rotating around the horizontal axis X and the vertical axis Y with respect to stand 12, even under the effect of small torques.

An opening is provided in the line of optical axis O of tilting mechanism 13 for receiving the optical element permitting unobstructed passage of light rays.

Figure 6:
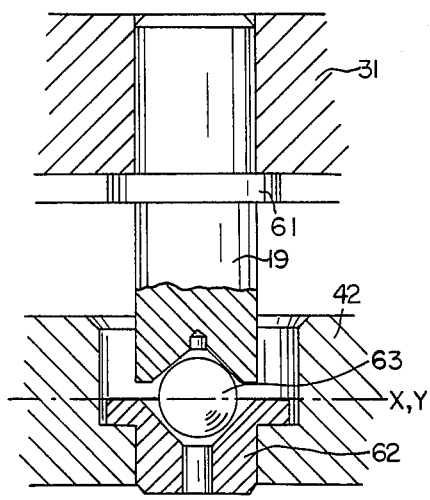
FIG. 6 is the section of the ball-seat-end tilting journal taken along line VI—VI of FIG. 1.

Ball-seat tilting pivot 19, shown on the sectional drawing of FIG. 6, is built up of pin 61 sleeve 62 and steel ball 63. Pins 16 of tilting pivots 19 are pressed by pairs into stationary part 41 and into supporting platform 31 along horizontal axis X and vertical axis Y, respectively. Sleeves 62 along both the horizontal and vertical axes are pressed into tilting ring 42 of which one of the two sleeves 62 of tilting pivots 29 is of conical shape, the other being of prismatic shape, in order to avoid imposing redundant constraint in the course of assembly. Pins 61 and sleeves 62 are coupled together through interposed steel balls 63. The centers of steel balls 63 are located in the plane defined by horizontal axis X and vertical axis Y.

For the adjustment of the mirrors, lenses and other optical elements by means of the setting mechanism described in the present patent specification, the elements are clamped to the supporting platform 31, ensuring thereby proper positioning of their active surface in the plane defined by horizontal axis X and vertical axis Y. In the course of adjustment, as a first step, the coarse setting to bring the element roughly into the required angular position is performed with tilting mechanism 13, making supporting platform tilt around horizontal axis X by means of the first setting knob 23, and around vertical axis Y by means of the second setting knob 24. In the course of these tilting operations, the optical element is displaced angularly only, since the centers of the steel balls always remain in the horizontal axis X and in the vertical axis Y, respectively. Invariant adjustment is thereby ensured.

Fine adjustment of the optical element into the required angular position with interferometric accuracy is then performed by means of micrometer 30. In the course of this fine adjustment, the required accuracy of interferometric precision is ensured by the application of stick slip-free knuckle joints 20.

Since the centers of knuckle joints 20 lie in horizontal axis X and vertical axis Y, respectively, the invariance of adjustment is ensured in the course of fine setting as well.

The advantages of the setting mechanism are the possibility of performing quickly—within a wide range and with a very high moving and aligning precision—the adjustment of optical elements into the desired angular position by the use of the coarse and fine setting mechanisms. The coarse, quick setting mechanism provides for a wide setting range, whereas the fine setting mechanism ensures high resolution of angular displacement and precision of alignment commensurate with the wave lengths of light, by virtue of the fully stick-slip-free knuckles.

In the course of setting, the axes of rotation pass through the center of the optical element, so only a change in angular position of the latter takes place.

During setting, the degrees of freedom are independent, so that setting can be performed conveniently and quickly.

Constructional setup and production of the adjusting mechanism are relatively simple.

The adjusting mechanism may be applied with advantage to measurements requiring wide setting ranges and high resolutions of adjustment, mainly in the field of laser applications.

I claim:

1. Apparatus for adjusting the angular position of an optical element, comprising
   (a) a stand;
   (b) a deformation frame connected with said stand by a deformation knuckle joint system for angular adjustment of said frame independently about two perpendicular axes of rotation;

(c) a supporting platform connected with said deformation frame by a tilting mechanism for angular adjustment of said platform relative to said deformation frame independently about two perpendicular axes of rotation, all of said rotation axes intersecting in the center of the optical element;

(d) means for fine angular adjustment of said deformation frame relative to said stand; and (e) means for coarse angular adjustment of said supporting platform relative to said deformation frame.

2. Apparatus as defined in claim 1, wherein said tilting mechanism includes (1) a stationary part rigidly connected to said frame;

(2) a tilting ring bearing against ball-seat-end tilting pivots arranged between said stationary part and said supporting platform; and (3) first draw spring means for connecting said supporting platform with said stationary part and with said tilting ring.

3. Apparatus as defined in claim 2, wherein said deformation frame includes (1) a first tilting block arranged perpendicularly to the horizontal axis and two second tilting blocks arranged perpendicularly to the vertical axis;

(2) a shim for fitting said tilting blocks together to form a rigid frame;

(3) said knuckle joint system including first and second pairs of knuckle joints, one pair arranged along the horizontal axis and one pair arranged along the vertical axis, respectively; and (4) at least one first outer member and one second outer member, each member separated by a gap from the adjacent tilting blocks and connected with said tilting blocks through said knuckle joints.

4. Apparatus as defined in claim 2, wherein said coarse adjustment means includes a first setting knob bearing against said supporting platform and coupled through a threaded joint to a tilting ring and a second setting knob coupled through a threaded joint to said stationary part and bearing against said tilting ring.

5. Apparatus as defined in claim 2, wherein said fine adjustment means comprises a micrometer fixed to a micrometer support accommodated on said stand and coupled to said stationary part of said coarse adjustment means through a supporting stub and bearing against a spacer block and a second draw spring connected to said micrometer support with said spacer block.

6. Apparatus as defined in claim 3, wherein said first pair of knuckle joints is provided with ball-seat-end tilting pivots fixed in said stationary part of said coarse adjustment means and arranged along the vertical axis as well as fixed in said supporting platform and arranged along the horizontal axis and bearing against said tilting ring.

7. Apparatus as defined in claim 3, wherein said second pair of knuckle joints has knuckles each confined by two holes.

8. Apparatus as defined in claim 7, wherein said second pair of knuckle joints has knuckles comprising thin sections of material for coupling together said first and second tilting blocks of said deformation frame and for connecting said first and second outer members along the horizontal and vertical axes.

* * * * *